(12) United States Patent
Marinelli et al.

(10) Patent No.: US 12,135,988 B2
(45) Date of Patent: *Nov. 5, 2024

(54) SYSTEM AND METHOD FOR BATCH EVALUATION PROGRAMS

(71) Applicant: Palantir Technologies Inc., Palo Alto, CA (US)

(72) Inventors: Eugene E. Marinelli, Palo Alto, CA (US); Yogy Namara, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/496,024

(22) Filed: Oct. 7, 2021

(65) Prior Publication Data

US 2022/0027195 A1    Jan. 27, 2022

Related U.S. Application Data

(63) Continuation of application No. 15/847,720, filed on Dec. 19, 2017, now Pat. No. 11,182,204, which is a continuation of application No. 15/144,602, filed on May 2, 2016, now Pat. No. 9,898,335, which is a continuation of application No. 13/657,635, filed on Oct. 22, 2012, now Pat. No. 9,348,677.

(51) Int. Cl.
*G06F 9/48* (2006.01)
*G06F 9/54* (2006.01)

(52) U.S. Cl.
CPC .......... *G06F 9/4881* (2013.01); *G06F 9/4843* (2013.01); *G06F 9/547* (2013.01); *G06F 2209/484* (2013.01)

(58) Field of Classification Search
None
See application file for complete search history.

(56) References Cited

U.S. PATENT DOCUMENTS

| | | |
|---|---|---|
| 5,819,255 A | 10/1998 | Celis |
| 6,321,274 B1 | 11/2001 | Shakib et al. |
| 6,851,108 B1 | 2/2005 | Syme et al. |
| 6,857,120 B1 | 2/2005 | Arnold et al. |
| 6,976,024 B1 | 12/2005 | Chavez et al. |

(Continued)

FOREIGN PATENT DOCUMENTS

| | | |
|---|---|---|
| CA | 2 828 264 | 4/2014 |
| CA | 2 829 266 | 4/2014 |

OTHER PUBLICATIONS

Claims in New Zealand Application No. P090010NZ:RMN dated Jan. 2015, 4 pages.

(Continued)

*Primary Examiner* — Chat C Do
*Assistant Examiner* — William C Wood
(74) *Attorney, Agent, or Firm* — Duane Morris LLP

(57) ABSTRACT

A batching module that prepares a plurality of blocked expressions for batch evaluation. The plurality of blocked expressions comprises a plurality of expressions in a blocked state. The batching module divides the plurality of blocked expressions into one or more partitions. For each particular partition of the one or more partitions, a single batch processing call is dispatched to an application server to perform a batch evaluation.

14 Claims, 8 Drawing Sheets

(56) References Cited

U.S. PATENT DOCUMENTS

| | | |
|---|---|---|
| 7,406,592 B1 | 7/2008 | Polyudov |
| 7,908,521 B2 | 3/2011 | Sridharan et al. |
| 8,499,287 B2 | 7/2013 | Shafi et al. |
| 2003/0023620 A1 | 1/2003 | Trotta |
| 2003/0105833 A1 | 6/2003 | Daniels |
| 2003/0212670 A1 | 11/2003 | Yalamanchi |
| 2004/0098731 A1 | 5/2004 | Demsey et al. |
| 2004/0139212 A1 | 7/2004 | Mukherjee et al. |
| 2004/0254658 A1 | 12/2004 | Sherriff |
| 2005/0131893 A1 | 6/2005 | Von Glan |
| 2006/0070046 A1 | 3/2006 | Balakrishnan et al. |
| 2006/0218123 A1 | 9/2006 | Chowdhuri |
| 2008/0010440 A1 | 1/2008 | Altman |
| 2009/0144747 A1 | 6/2009 | Baker |
| 2009/0172674 A1 | 7/2009 | Bobak et al. |
| 2009/0193012 A1 | 7/2009 | Williams |
| 2009/0248721 A1 | 10/2009 | Burton et al. |
| 2009/0319996 A1 | 12/2009 | Shafi et al. |
| 2010/0205198 A1 | 8/2010 | Mishne |
| 2010/0313119 A1 | 12/2010 | Baldwin |
| 2011/0016458 A1* | 1/2011 | Beale ............... G06F 9/45508 717/137 |
| 2011/0173619 A1* | 7/2011 | Fish .................. G06F 16/2365 718/101 |
| 2012/0143816 A1 | 6/2012 | Zhang |
| 2012/0284719 A1 | 11/2012 | Phan et al. |
| 2013/0013577 A1 | 1/2013 | Fee |
| 2013/0055264 A1 | 2/2013 | Burr |
| 2014/0115589 A1 | 4/2014 | Marinelli, III et al. |
| 2014/0115610 A1 | 4/2014 | Marinelli, III et al. |

OTHER PUBLICATIONS

Australian Patent Office, "Patent Examination Report No. 1", in application No. 2013237710, dated Jan. 16, 2015, 3 pages.
Bogle, Philip, "Reducing Cross-Domain Call Overhead Using Beatched Futures", dated May 1994, 96 pages.
Canadian Claims in application No. 2,828,264, dated Apr. 2016, 4 pages.
Canadian Claims in application No. 2,829,266, dated Apr. 2016, 5 pages.
Canadian Intellectual Property Office, "Exam Report" in application No. 2,829,266, dated Apr. 28, 2015, 3 pages.
Canadian Intellectual Property Office, "Seach Report" in application No. 2,828,264, dated Apr. 11, 2016, 4 pages.
Canadian Intellectual Property Office, "Search Report" in application No. 2,828,264, dated Apr. 28, 2015, 4 pages.
Canadian Intellectual Property Office, "Search Report" in application No. 2,829,266, 4 pages, dated Apr. 1, 2016, 4 pages.
Claims in Australian Application No. 2013237658, dated Feb. 2015, 4 pages.
Australian Patent Office, "Patent Examination Report No. 1", in application No. 2013237658, dated Feb. 2, 2015, 5 pages.
Claims in Canadian Application No. 2,829,266, dated Apr. 2015, 4 pages.
Wikipedia, "Machine Code", pp. 1-5.
Current Claims in application No. Gb1318666.3 dated Mar. 2014, 3 pages.
Current Claims in Great Britian application No. GB1318667.1, dated Mar. 2014, 3 pages.
Current Claims in New Zealand application No. P089467NZ:RM, dated May 2014, 4 pages.
Intellectual Property Office of London, "Examination Report with Search Report" in application No. GB1318666.3, dated Mar. 24, 2013.
Intellectual Property Office of London, "Examination Report with Search Report", in application No. GB1318667.1, dated Mar. 28, 2014, 8 pages.
Intellectual Property Office, "Further Examination Report" in application No. P090010NZ:RMN, dated Jan. 26, 2015, 2 pages.
Jacques, M., "An Extensible Math Expression Parser With Plug-Ins", Code Project, dated Mar. 13, 2008, http://www.codeproject.com/Articles/7335/An-extensible-math-expression-parser-with-plugins, 34pgs.
New Zealand Intellectual Property Office, Examination Report in application No. P089467NZ:RM, dated May 7, 2014, 1 page.
Stamos et al., "Remote Evaluation" Journal ACM Transactions on Programming Languages and Systems (TOPLAS) vol. 12 Issue 4, dated Oct. 1990, pp. 537-564.
Claims in Australian Application No. 2013237710, dated Jan. 2015, 4 pages.
U.S. Appl. No. 13/657,635, filed Oct. 22, 2012, Office Action, Dec. 20, 2013.
U.S. Appl. No. 13/657,656, filed Oct. 22, 2012, Corrected Notice of Allowability, Aug. 17, 2016.
U.S. Appl. No. 13/657,656, filed Oct. 22, 2012, Office Action, Oct. 7, 2014.
U.S. Appl. No. 13/657,656, filed Oct. 22, 2012, Notice of Allowance, May 10, 2016.
U.S. Appl. No. 13/657,656, filed Oct. 22, 2012, Final Office Action, May 6, 2015.
U.S. Appl. No. 13/657,656, filed Oct. 22, 2012, Corrected Notice of Allowability, Jul. 14, 2016.
U.S. Appl. No. 13/657,635, filed Oct. 22, 2012, Final Office Action, Oct. 7, 2015.
U.S. Appl. No. 13/657,635, filed Oct. 22, 2012, Office Action, Mar. 30, 2015.
U.S. Appl. No. 13/657,635, filed Oct. 22, 2012, Final Office Action, Jul. 10, 2014.
U.S. Appl. No. 13/657,635, filed Oct. 22, 2012, Notice of Allowance, Jan. 29, 2016.
Marinelli, III, U.S. Appl. No. 15/144,602, filed May 2, 2016, Notice of Allowance, Sep. 7, 2017.
Marinelli III, U.S. Appl. No. 15/144,602, filed May 2, 2016, Office Action, Jan. 30, 2017.

* cited by examiner

SYSTEM AND METHOD FOR BATCH EVALUATION PROGRAMS

BENEFIT CLAIM

This application claims the benefit under 35 U.S.C. §120 as a Continuation of U.S patent application Ser. No. 15/847,720, filed Dec. 19, 2017, which claims the benefit of U.S. patent application Ser. No. 15/144,602, filed May 2, 2016, which claims the benefit of U.S. patent application Ser. No. 13/657,635, filed Oct. 22, 2012, the entire contents of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present disclosure relates generally to data access and analysis and, more specifically, to a system and method for evaluating programs in batch.

BACKGROUND

Software applications, such as financial analysis applications, allow users to create and interact with large software data objects. Such data objects organize data relevant to the software application and provide methods that allow operations to be performed on the data. In some situations, the operations are performed on a large set of data and require high processing power as well as high bandwidth access to a database.

Typically, for the efficient processing of such operations, the bulk of the processing occurs on a server that is external to the computing device that executes the software application. In operation, the software application transmits calls associated with the operations to be performed on the data, and the calls are processed on the server. The results of the processing are then transmitted back to the software application for presentation to the user.

One drawback to such an implementation is that the server receives and processes one call per operation to be performed. In situations where operations are performed on an extremely large set of data, serving a large amount of calls can slow down the server and, in some cases, crash the server. Such a scenario is extremely undesirable because the server is extremely slow and in some cases entirely unusable, thereby affecting the overall user experience.

As the foregoing illustrates, what is needed in the art is a mechanism for efficiently managing and processing a large volume of calls to be processed on a server.

SUMMARY

In one embodiment, a method is provided for evaluating a plurality of expressions in batch. The method includes preparing a plurality of blocked expressions for batch evaluation, wherein the plurality of blocked expressions comprises a current expression in a particular stack in a blocked state and dividing the plurality of blocked expressions into one or more partitions. The method further includes, for each particular partition of the one or more partitions, dispatching a single batch processing call to an application server to perform a batch evaluation.

Advantageously, because a single batch processing request is transmitted to the application server for a group of similar expressions, the number of processing requests received by the application server is reduced. As a result, the application server is not burdened with a large amount of requests at any given time. Therefore, the overall processing efficiency of the application server is increased and the overall processing latency of the application server is reduced.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
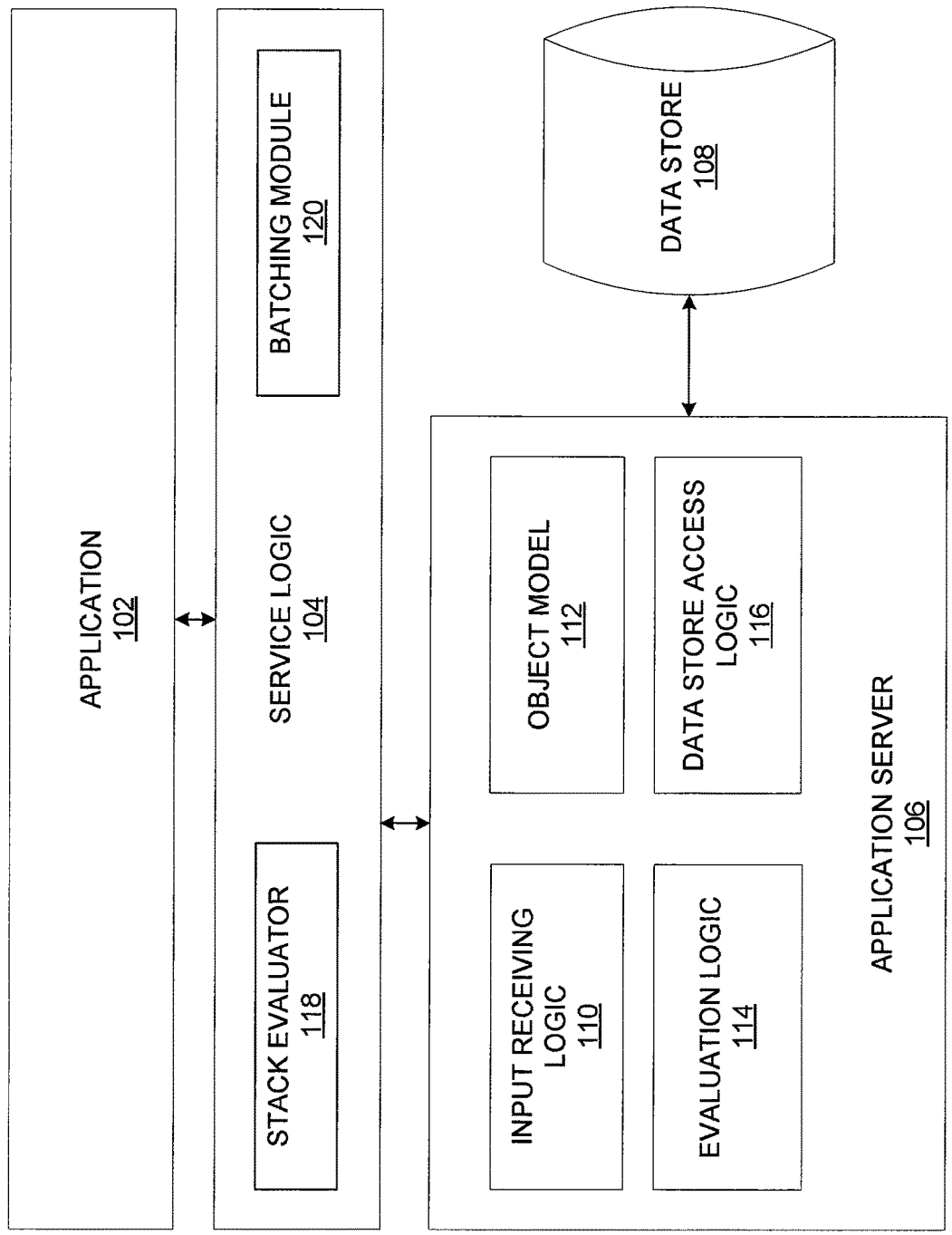
FIG. 1 illustrates a system that enables an application to be processed in batch-mode, according to one embodiment of the invention.

FIG. 1 illustrates a system 100 that enables an application to be processed in batch-mode. As shown, the system 100 includes an application 102, service logic 104, an application server 106 and a data store 108.

The application 102 is a software program that allows a user to create, analyze and interact with workflows having one or more documents. A document is typically composed of several data objects, each having a particular type and function. The data objects that could make up a document are described in greater detail below. A user, via a programming interface, can typically write program routines that interact with the data objects to generate the results or analysis needed. Again, some examples of such instructions are described below.

The service logic 104 is an infrastructure layer that, among other things, allows the application 102 to communicate with the application server 106. In one embodiment, the service logic 104 includes a messaging service (not shown) that allows the application 102 and the application server 106 to communicate asynchronously via messages. The service logic 104 includes a stack evaluator 118 and a batching module 120. The stack evaluator 118 is an infrastructure module that manages the stack-based evaluation of program routines associated with the application 102. Each program routine is associated with a call stack that includes multiple frames, each frame storing information about a particular portion of the program routine. The batching module 120 allows for the batch processing on the application server 106 of program routines being evaluated within the stack evaluator 118. The functions of the stack evaluator 118 and the batching module 120 is described in greater detail below in conjunction with FIGS. 2A-6B.

The application server 106 includes logical elements such as input receiving logic 110, an object model 112, evaluation logic 114 and data store access logic 116. The application server 106 may be implemented as a special-purpose computer system having the logical elements shown in FIG. 1. In one embodiment, the logical elements comprise program instructions stored on one or more machine-readable storage media. Alternatively, the logical elements may be implemented in hardware, firmware, or a combination thereof.

The input receiving logic 110 receives inputs from different applications executing within the system 100, such as the application 102, via the service logic 104. Inputs include, but are not limited to, processing requests, data access/storage requests and expression evaluation requests. The input receiving logic 110 transmits requests received from the different applications to logical elements within the application server 106 that are configured to process those requests.

The object model 112 is a model that specifies a universe of data objects, relationships between the data objects, higher-order data objects generated based on one or more zero-order data objects in the universe, higher-order data objects generated based on other higher-order data objects, and auxiliary entities related to the universe of data objects. The data objects may be created by users via data object creation mechanisms exposed in different applications, such as the application 102. In one embodiment, the object model 112 includes only references to the data objects and data related to those data objects is stored within the data store 108. Persons skilled in the art would understand that any other data objects can be included in the object model 112.

The evaluation logic 114 receives expression evaluation requests from applications, such as the application 102, via the input receiving logic and evaluates the expressions specified in those requests. An expression typically includes a reference to one or more data objects included in the object model 112 and specifies one or more operations to be performed on those data objects. The evaluation logic 114, when processing a particular expression, may create, modify, delete and store data objects that are associated with the universe of data objects included in the object model 112. In addition, the evaluation logic 112 transmits the results of processing the particular expression to the application that transmitted the expression evaluation request.

In an embodiment, application server 106 comprises data store access logic 116. Data store access logic 116 may comprise a set of program instructions which, when executed by one or more processors, are operable to access and retrieve data from data store 108. For example, data store access logic 116 may be a database client or an Open Database Connectivity (ODBC) client that supports calls to a database server that manages data store 108. Data store 108 may be any type of structured storage for storing data including, but not limited to, relational or object-oriented databases, data warehouses, directories, data files, and any other structured data storage.

Figure 2A:
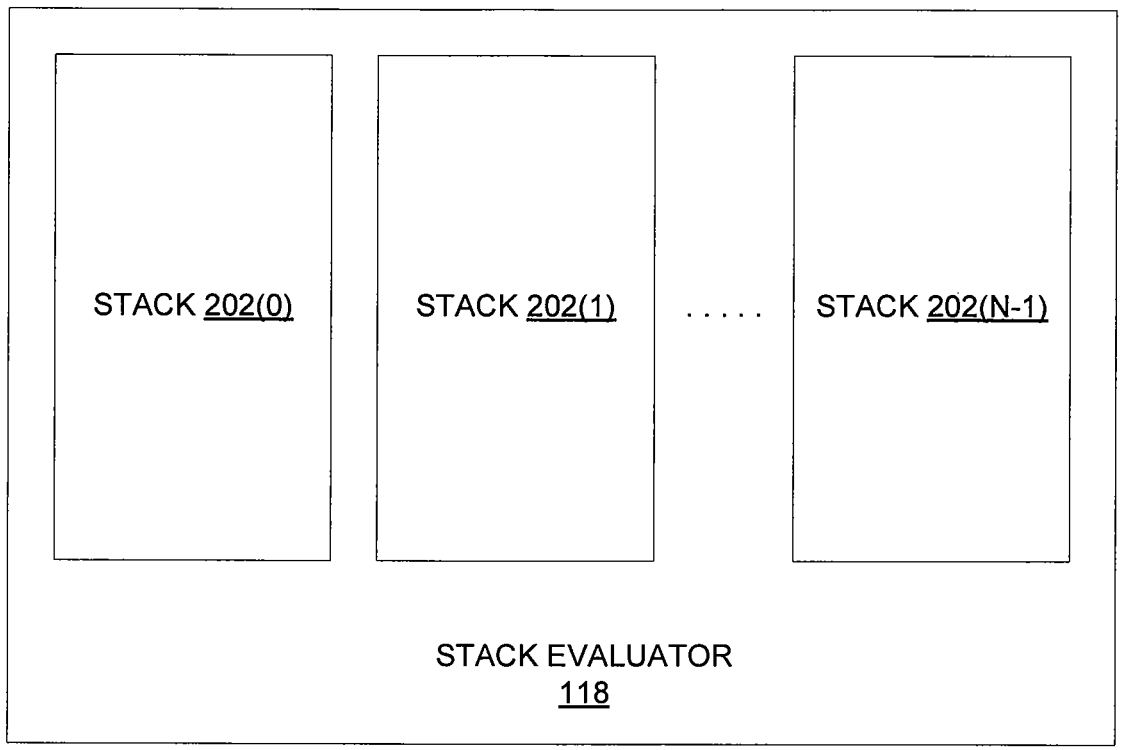
FIG. 2A illustrates a more detailed view of the stack evaluator of FIG. 1, according to one embodiment of the invention.

FIG. 2A illustrates a more detailed view of the stack evaluator 118 of FIG. 1, according to one embodiment of the invention. As shown, the stack evaluator 118 includes multiple stacks 202.

The stack evaluator 118 generates a stack 202 corresponding to each program subroutine (referred to herein as a "subroutine") associated with the application 102. Typically, a subroutine includes multiple instructions, where each instruction includes one or more expressions to be evaluated. As discussed above, an expression may include an argument, a parameter and/or a metric, as described above. When evaluating a particular instruction, the stack evaluator 118 generates a different frame for each expression within that instruction. For example, an array frame is generated for each argument of an instruction and a call frame is generated for performing a specified operation on the arguments that were evaluated in the array frame(s).

Figure 2B:
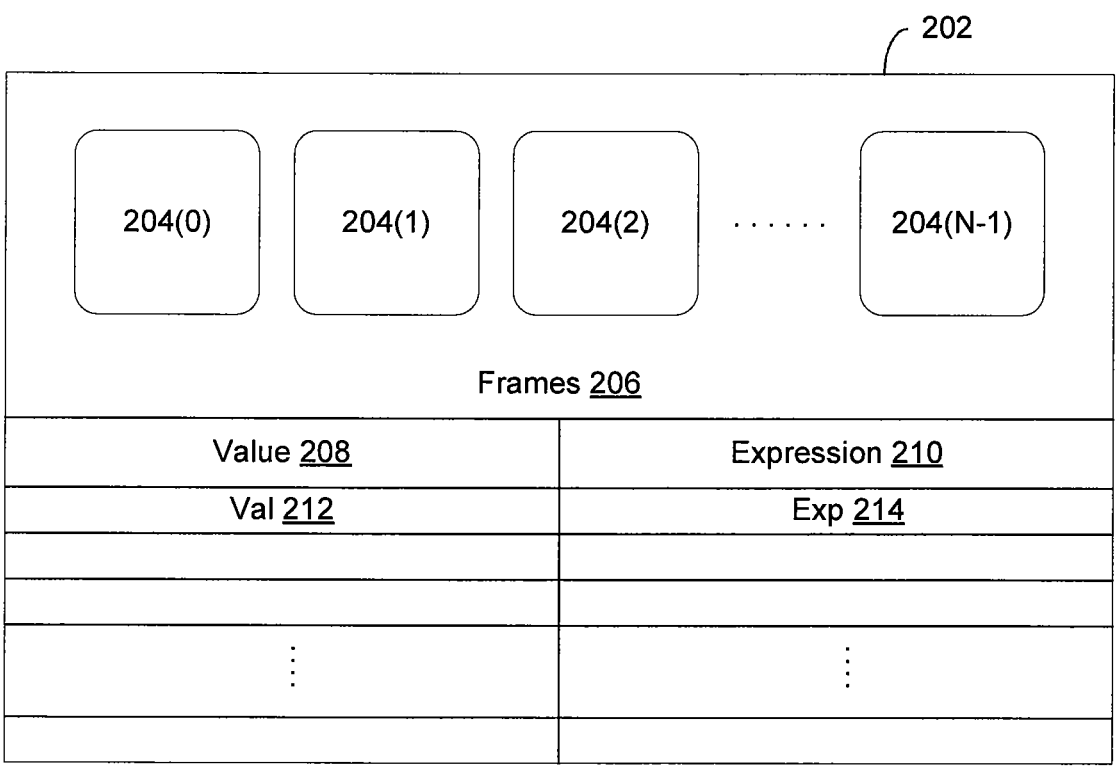
FIG. 2B illustrates a more detailed view of the stack of FIG. 2A, according to one embodiment of the invention.

FIG. 2B illustrates a more detailed view of a stack 202 of FIG. 2A, according to one embodiment of the invention. As shown, the stack 202 includes a frames portion 206, a value portion 208 and an expression portion 210.

The frames portion 206 includes multiple frames 204, where each frame 204 corresponds to a particular evaluation iteration of the subroutine corresponding to the stack 202. When a particular frame is ready for evaluation, the stack 202 transitions to an "evaluation state." During evaluation, the expressions within the current frame are first extracted and pushed into the expression array 210, such as exp 214. The value of the expressions are then evaluated and pushed into the value array 208. If an expression being evaluated is nested, the evaluation of the expression in the current frame 204 generates one or more new frames 204 that are evaluated before evaluating the current frame. Once the evaluation of each frame in the stack 202 is completed, the stack 202 transitions to a "completed state."

Figure 3:
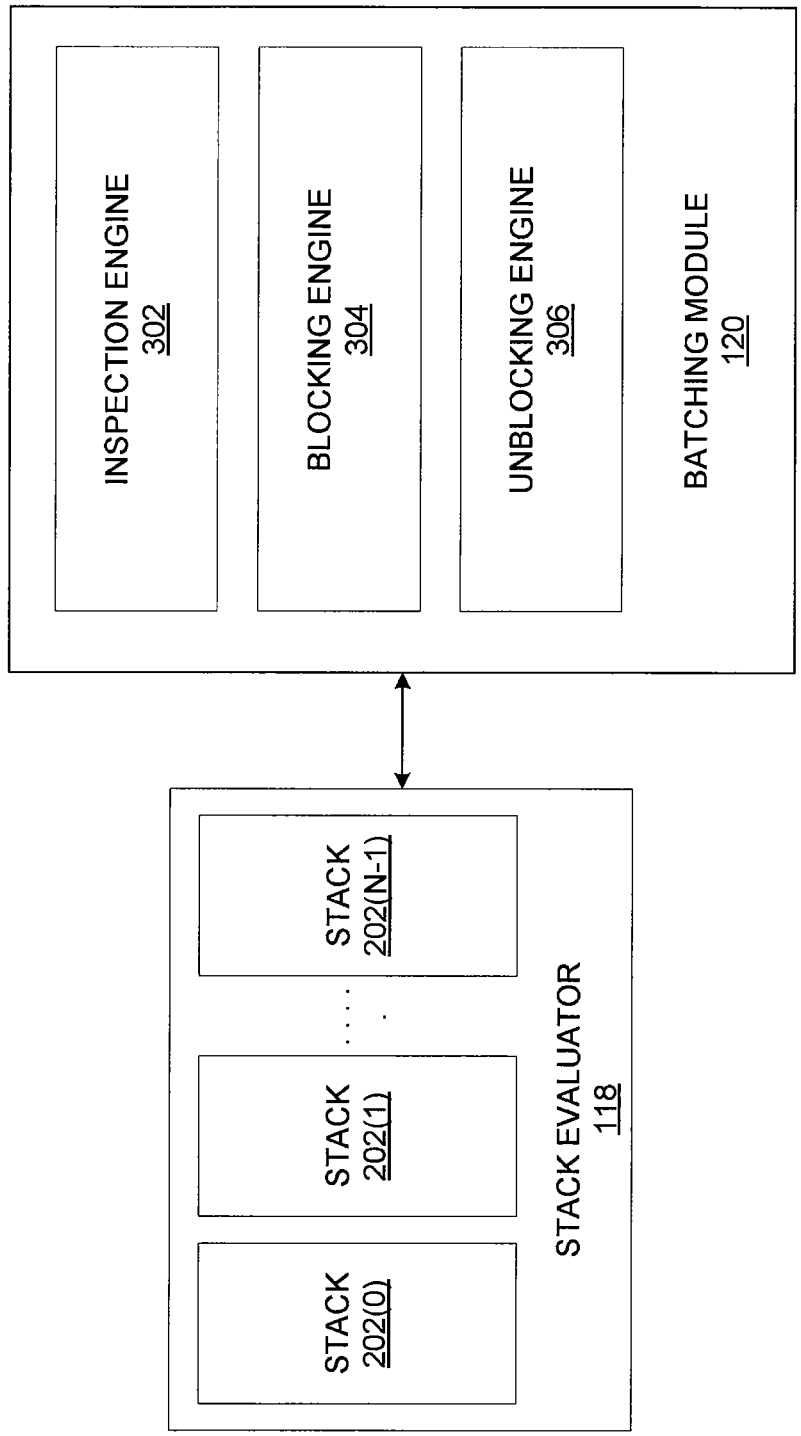
FIG. 3 illustrates a more detailed view of the batching module of FIG. 1, according to one embodiment of the invention.

FIG. 3 illustrates a more detailed view of the batching module 120 of FIG. 1, according to one embodiment of the invention. As shown, the batching module 120 includes an inspection engine 302, a blocking engine 304 and an unblocking engine.

The batching module 120 monitors the execution of program subroutines within the stack evaluator 118 to identify program subroutines that can be processed within the application server 106 in batch. More specifically, for each stack 202, the inspection engine 302 analyzes a current expression within a frame 204 of the stack 202 to determine whether the evaluation of the expression should be evaluated in batch with other similar expressions.

To determine whether a particular expression should be evaluated in batch with other similar expressions, the inspection engine 302 first determines the type of the expression. An expression may be an economic index, an instrument, a metric, an input object, an output object, a parameter, a time series, a higher-order-object, or any higher-order object in the object model. Based on the type of expression, the inspection engine 302 then determines whether the type of the expression falls within a predetermined category of expressions that should be processed in batch with other expressions of the same type or a similar type. For example, an expression that includes a metric for which the evaluation involves a database access or a model access should be processed in batch with other expressions that include metrics for which the evaluation involves database accesses or model accesses.

As another example, consider the following program instruction: return this.close+this.open, where "this" refers to a time series. There are multiple expressions within the program instruction, such as "this.close," "+," and "this.open." In one scenario, the program instruction may be evaluated multiple times, each evaluation generating a different stack 202. In such a scenario, the inspection engine 302 may identify the expressions "this.close" and "this.open" as expressions that should be evaluated in batch with similar expressions. Therefore, for each stack 202, the corresponding "this.close" expression is evaluated in batch with the "this.close" expressions in the remaining stacks 202. Similarly, for each stack 202, the corresponding "this.open" expression is evaluated in batch with the "this.open" expressions in the remaining stacks 202.

For a particular stack 202, once the inspection engine 302 determines that the current expression should be evaluated in batch with other similar expressions, the blocking engine 304 blocks the processing of the current expression and the stack 202, in general. At this instant, the stack 202 transitions to a "blocked state." Therefore, at any given point, a stack 202 is either in an evaluation state, a blocked state or a completed state. When all the stacks 202 are either in a blocked state or a completed state, the blocking engine 304 prepares the current expressions in each of the blocked stacks 202 (referred to herein as the "blocked expressions") for evaluation on the application server 106 in batch. The blocking engine 304 divides the blocked expressions into partitions, where blocked expressions in a particular partition are each associated with at least one similar characteristic. For example, each blocked expression in a particular partition may need a database call to be executed by the application server 106.

Once the blocked expressions are divided into partitions, the blocking engine 304 dispatches, per partition, a single call to the application server 106 for evaluating all of the expressions in that partition. The application server 106 evaluates the expression in a manner described above in conjunction with FIG. 1. The application server 106 transmits the results associated with each expression in a partition to the unblocking engine 306. For each result associated with a particular expression, the unblocking engine 306 updates the stack 202 corresponding to the expression to store the result. The updated stack 202 is then unblocked and the frames 204 within the stack 202 continue to be processed.

The inspection engine 302 continues to inspect the stacks 202 to identify expressions that can be evaluated in batch. In turn, the blocking engine 304 continues to block stacks 202 and dispatch calls for evaluating similar expressions in batch until each of the stacks 202 is in a completed state. In such a manner, similar expressions from different stacks 202 are processed in batch within the application server 106, thus increasing the efficiency of the overall system.

Figure 4:
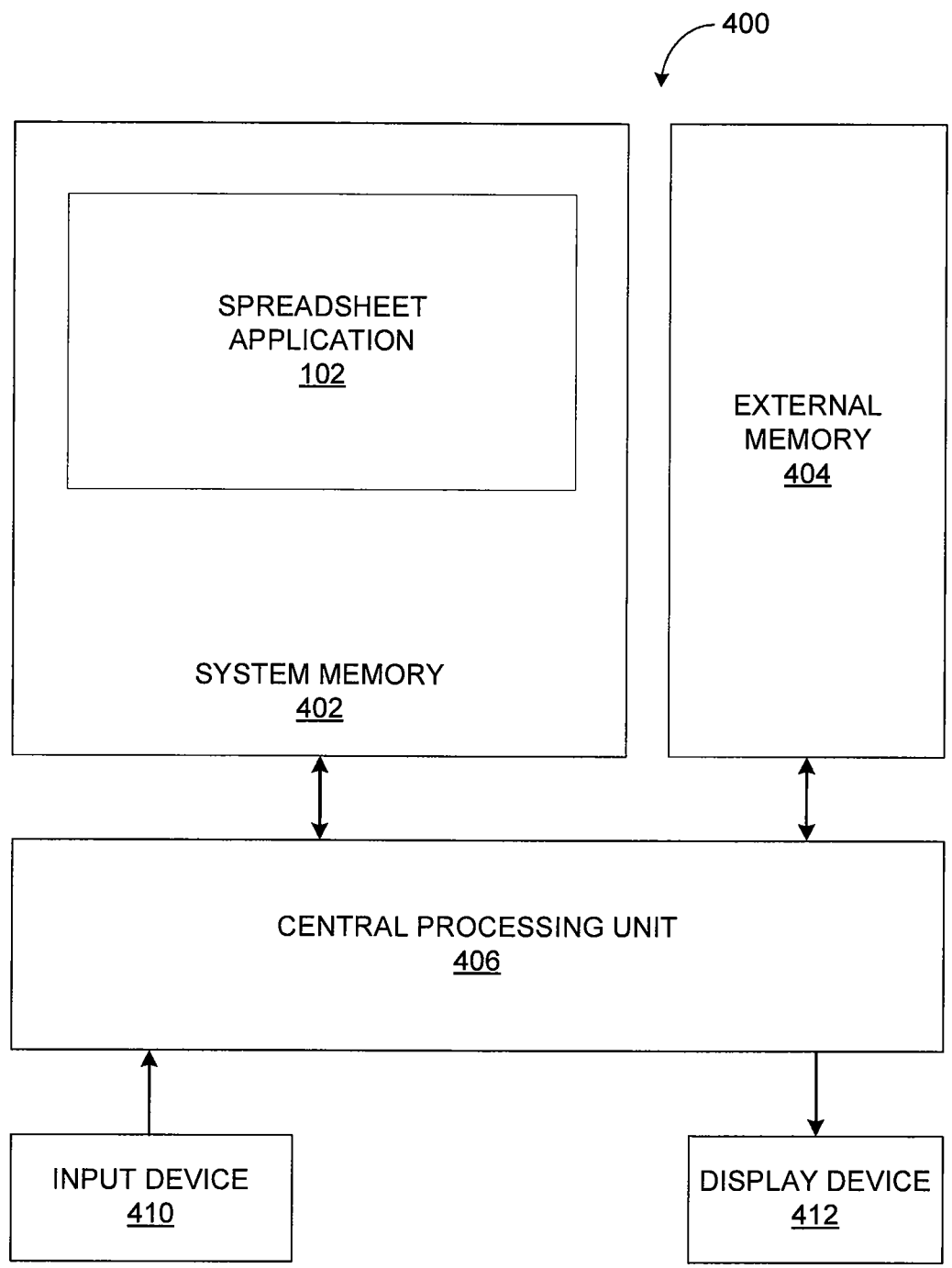
FIG. 4 is an exemplary system within which the application of FIG. 1 could execute, according to one embodiment of the invention.

FIG. 4 is an exemplary system within which the application 102 of FIG. 1 could execute, according to one embodiment of the invention. As shown, the system 400 includes a system memory 402, an external memory 404, a central processing unit (CPU) 406, an input device 410 and a display device 412.

The system memory 402 includes the application 102 previously described herein. The system memory 402 is a memory space, usually a random access memory (RAM), that temporarily stores software programs running within the system 400 at any given time. The CPU 406 executes a sequence of stored instructions associated with and/or transmitted from the various elements in the computer system 400. The external memory 404 is a storage device, e.g. a hard disk, for storing data associated with the application 102. The input device 410 is an end-user controlled input device, e.g. a mouse or keyboard that allows a user to manipulate various aspects of the application 102. The display device 412 may be a cathode-ray tube (CRT), a liquid crystal display (LCD) or any other type of display device.

Figure 5A:
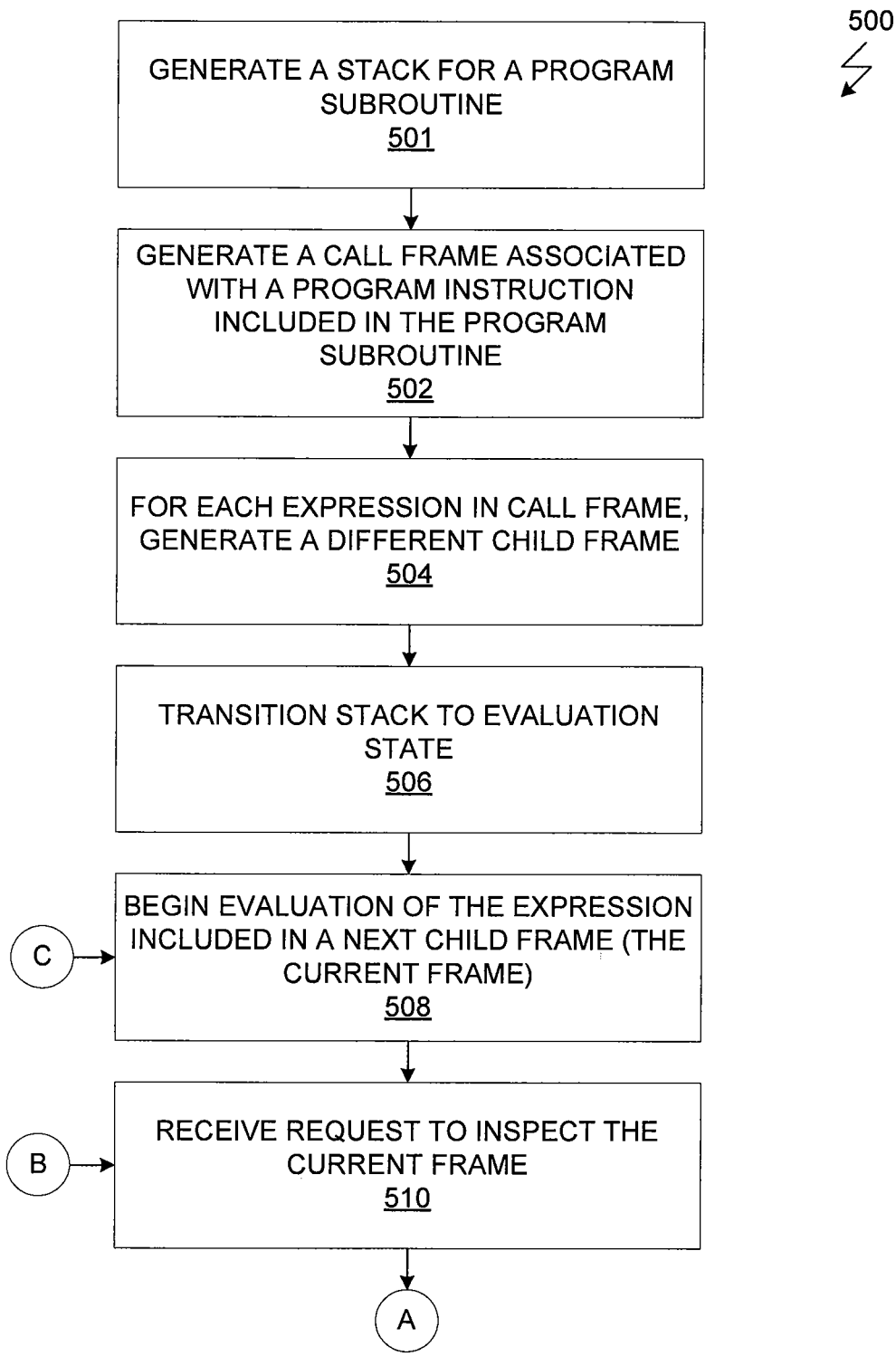
FIGS. 5A and 5B set forth a flow diagram of method steps for evaluating a program instruction within the stack evaluator, according to one embodiment of the invention.
Figure 5B:
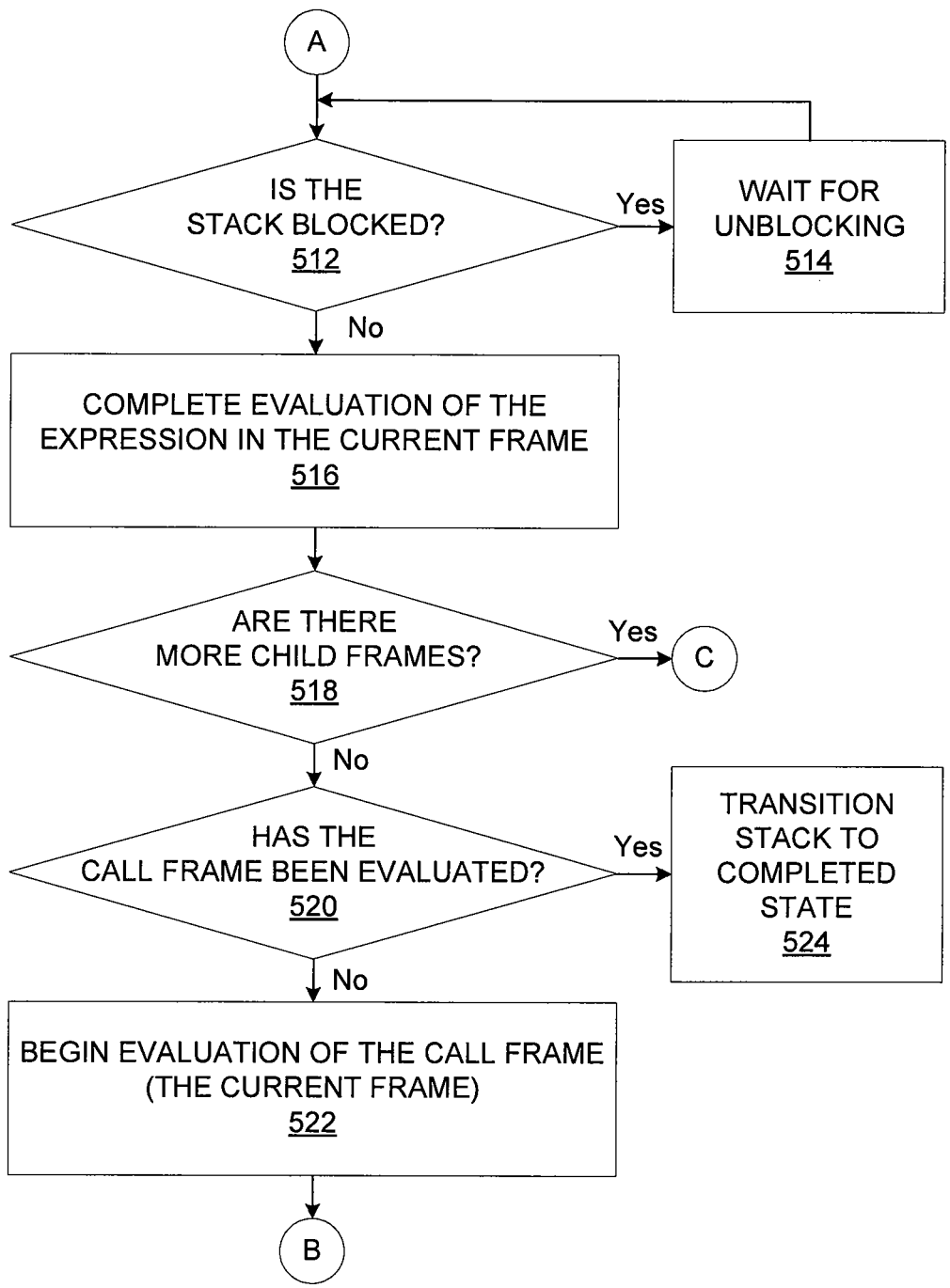

FIGS. 5A and 5B set forth a flow diagram of method steps for evaluating a program instruction within the stack evaluator, according to one embodiment of the invention. Although the method steps are described in conjunction with the system for FIG. 1-4, persons skilled in the art will understand that any system configured to perform the method steps, in any order, is within the scope of the invention.

The method 500 begins at step 501, where the stack evaluator 118 generates a stack 202 corresponding to a program subroutine associated with the application 102 that is being evaluated. At step 502, the stack evaluator 118 generates a call frame associated with a particular program instruction included in the program subroutine. As discussed above, each program instruction within a program subroutine includes one or more expressions to be evaluated. An expression may be an argument, a parameter and/or a metric, as described above. Therefore, the call frame associated with the particular program instruction includes the one or more expressions to be evaluated.

At step 504, the stack evaluator 118 generates a different child frame for evaluating each expression within that instruction. For example, an array frame is generated for each argument of an instruction. At step 506, the stack evaluator 118 transitions the stack 202 to an evaluation state. At step 508, the stack evaluator 118 begins the evaluation of an expression included in a next child frame to be evaluated (referred to herein as the "current frame"). An expression is evaluated either within the stack evaluator 118 itself or needs to be processed within the application server 106 as described above in conjunction with FIG. 1.

At step 510, the stack evaluator 118 receives a request from the inspection engine 302 to inspect the current frame. As described above, each time a new frame is being evaluated, the inspection engine analyzes a current expression that is to be evaluated within the frame to determine whether the evaluation of the expression should be executed in batch with other similar expressions. The process of inspection and batch execution is described in detail with respect to FIGS. 6A and 6B.

At step 512, the stack evaluator 118 determines whether the stack 202 is in a blocked state. As discussed above and described in greater detail with respect to FIGS. 6A and 6B, for a particular stack 202, if the inspection engine 302 determines that the current expression should be evaluated in batch with other similar expressions, then the blocking engine 304 blocks the processing of the current expression and the stack 202, in general. If, at step 512, the stack evaluator 118 determines that the stack 202 is in a blocked state, then the method 500 proceeds to step 514, where the stack evaluator 118 waits until the stack 202 is unblocked by the unblocking engine 306. However, if, at step 512, the stack evaluator 118 determines that the stack 202 is not in a blocked state, then the method 500 proceeds to step 516, where the stack evaluator 118 completes the evaluation of the expression in the current frame.

At step 518, the stack evaluator 118 determines whether any child frames were generated at step 504 are still not evaluated. If so, then the method proceeds to step 508 previously described herein. If the stack evaluator 118 determines that all the child frames were generated at step 504 have been evaluated, then the method 500 proceeds to step 520. At step 520, the stack evaluator 118 determines whether the call frame that was generated at step 502 has been evaluated.

If, at step 520, the stack evaluator 118 determines that the call frame that was generated at step 502 has not been evaluated, then the method 500 proceeds to step 522. At step 522, the stack evaluator 118 begins the evaluation of the call frame based on the expressions that were evaluated via the child frames. The method then proceeds to step 510 previously described herein.

If, however, at step 520, the stack evaluator 118 determines that the call frame that was generated at step 502 has already been evaluated, then the method 500 proceeds to step 524. At step 524, the stack evaluator 118 transitions the state of the stack 202 to the completed state. The method 500 then ends.

As discussed above, the application 102 is associated with one or more program subroutines and each program subroutine includes multiple program instructions. Persons skilled in the art would recognize that the stack evaluator 118 executes the method steps described with respect to FIGS. 5A and 5B for each program instruction included in each program subroutine associated with the application 102, as discussed above.

Figure 6A:
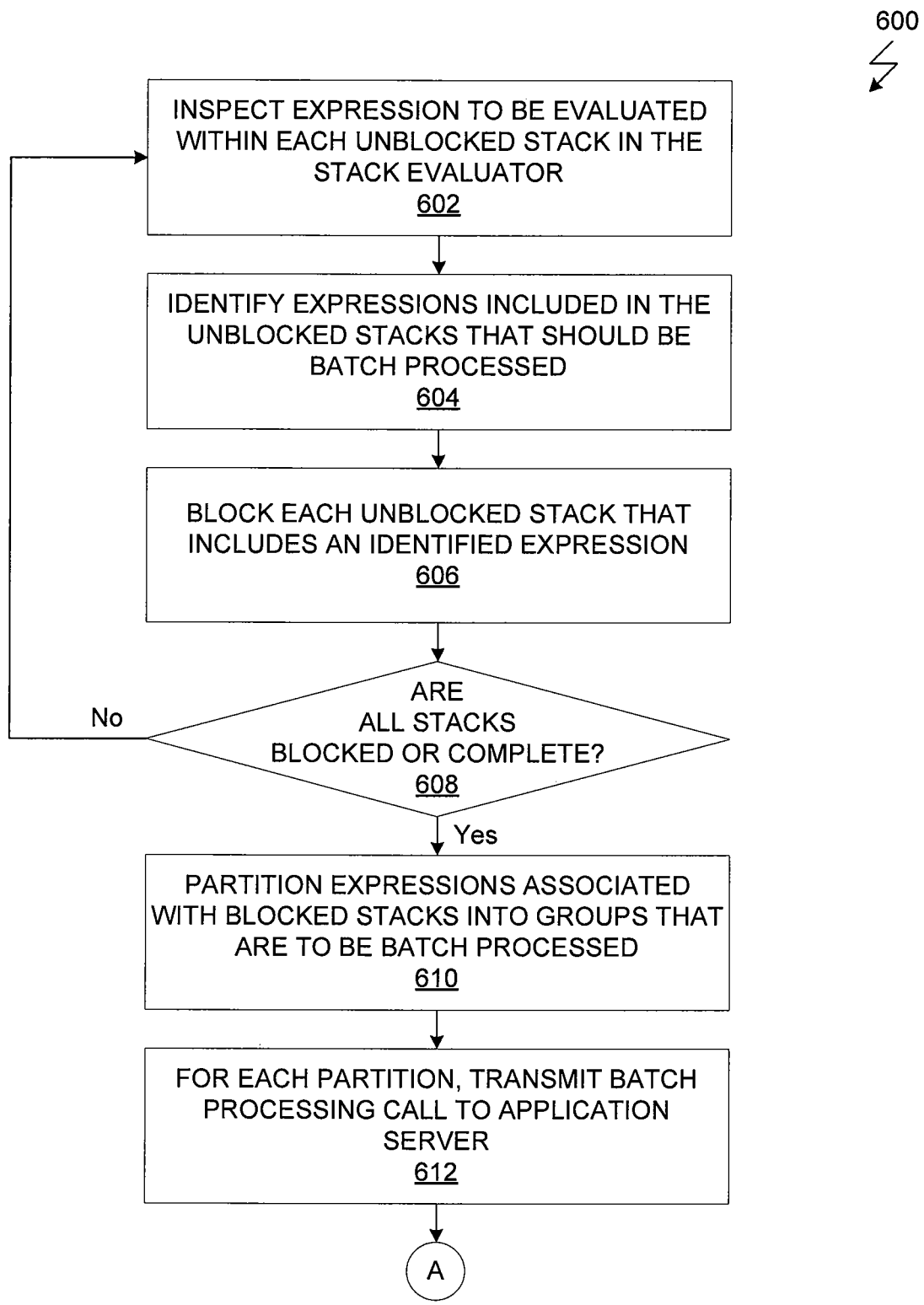
FIGS. 6A and 6B set forth a flow diagram of method steps for processing related program instructions in batches, according to one embodiment of the invention.
Figure 6B:
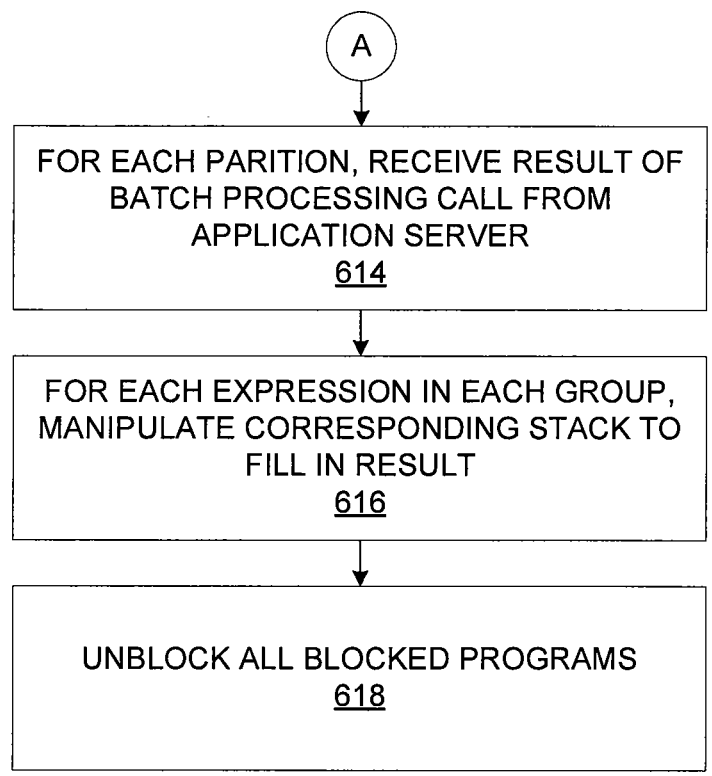

FIGS. 6A and 6B set forth a flow diagram of method steps for processing related program instructions in batches, according to one embodiment of the invention. Although the method steps are described in conjunction with the system for FIGS. 1-4, persons skilled in the art will understand that any system configured to perform the method steps, in any order, is within the scope of the invention.

The method 600 begins at step 602, where the inspection engine 302, for each stack 202, inspects an expression within the stack 202 that is to be evaluated. At step 604, the inspection engine 302, based on the inspection, identifies one or more expressions included in the unblocked stacks that should be batch processed. As previously described, the inspections engine 302 identifies such expressions based on a type of the expression, the number of inputs specified in the expression, the type of operation to be performed, etc.

At step 606, the blocking engine 304 blocks the processing of the expressions identified at step 604 and the stacks 202 that include those expressions. In one embodiment, the blocking engine 304 transitions the state of each of the stacks 202 to a blocked state. At step 608, the blocking engine 304 determines whether all the stacks are in a blocked or completed state. If, at step 608, at least one stack is not in a blocked or completed state, then the method 600 returns to step 602. If, however, at step 608, all the stacks are in a blocked or completed state, then the method 600 proceeds to step 610.

At step 610, the blocking engine 304 divides the expressions included in the blocked stacks into partitions, where expressions in a particular partition are each associated with at least one similar characteristic. For example, each blocked expression in a particular partition may be a database call to be executed by the application server 106. At step 612, once the blocked expressions are divided into partitions, the blocking engine 304 dispatches, for each partition, a single call to the application server 106 for evaluating each of the expressions in that partition in batch. The application server 106 evaluates the expression in a manner described above in conjunction with FIG. 1.

At step 614, the unblocking engine 306 receives, for each partition, the results for each expression in the partition. At step 616, for each received result, the unblocking engine 306 updates the stack 202 corresponding to the expression for which the result was generated to store the result. At step 618, the unblocking engine 306 unblocks each of the updated stacks 202, which then continue to be processed.

Advantageously, because a single batch processing request is transmitted to the application server for a group of similar expressions, the number of processing requests received by the application server is reduced. As a result, the application server is not burdened with a large amount of requests at any given time. Therefore, the overall processing efficiency of the application server is increased and the overall processing latency of the application server is reduced.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention may be implemented as a program product deployed for use over a network. In such an embodiment, the program product may be accessed via a web browser.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method comprising:
in a stack evaluator:
starting evaluating an expression included in a current frame of a current stack, comprising having the expression inspected,
the current stack corresponding to a program subroutine associated with an application program that is running and including multiple frames;
determining that the current stack is unblocked;
completing evaluation of the expression in the current frame; and
repeating the starting, determining, and completing step for all frames of the current stack;
in a batching module;
inspecting a group of expressions in a plurality of stacks;
identifying a plurality of expressions for batch evaluation in one or more stacks of the plurality of stacks,
the plurality of expressions comprising the expression in the current frame of the current stack,
the plurality of stacks being in an unblocked state;
transitioning a state of each stack of the one or more stacks to the blocked state;
determining that every stack in the plurality of stacks is in a state or a completed state;
dividing, in response to the determining, the plurality of blocked expressions into one or more partitions, wherein each partition of the one or more partitions comprises one or more blocked expressions associated with at least one similar characteristic, wherein the dividing is based, at least in part, on the at least one similar characteristic;

for each particular partition of the one or more partitions, dispatching a single batch processing call to an application server to perform a batch evaluation of the one or more blocked expressions associated with the at least one similar characteristic, receiving results from the application server, and updating the one or more blocked expressions with the results; and unblocking the one or more stacks, wherein the method is performed using one or more processors.

2. The method of claim 1, further comprising:

transitioning a state of each stack of the plurality of stacks in the blocked state to the unblocked state or the completed state.

3. The method of claim 1, wherein identifying expressions for batch evaluation comprises determining whether the expressions have a particular characteristic that is included in a pre-determined list of characteristics that are associated with expressions that should be batch evaluated.

4. The method of claim 3, wherein the pre-determined list of characteristics comprises a characteristic of an expression that is evaluated via a database call.

5. The method of claim 3, wherein the pre-determined list of characteristics comprises a characteristic of an expression that specifies a plurality of inputs.

6. The method of claim 1, wherein the current stack comprises a plurality of frames and wherein each frame of the plurality of frames corresponds to a particular evaluation iteration of the program subroutine.

7. The method of claim 1, wherein the one similar characteristic comprises an attribute and wherein the attribute is one of: type of an expression, number of inputs specified in the expression, or a type of operation to be performed by the expression.

8. One or more non-transitory computer-readable media storing instructions, which when executed by one or more processors cause:

in a stack evaluator:

starting evaluating an expression included in a current frame of a current stack, comprising having the expression inspected, the current stack corresponding to a program subroutine associated with an application program that is running and including multiple frames;

determining that the current stack is unblocked;

completing evaluation of the expression in the current frame; and repeating the starting, determining, and completing step for all frames of the current stack;

in a batching module;

inspecting a group of expressions in a plurality of stacks;

identifying a plurality of expressions for batch evaluation in one or more stacks of the plurality of stacks, the plurality of expressions comprising the expression in the current frame of the current stack, the plurality of stacks being in an unblocked state;

transitioning a state of each stack of the one or more stacks to the blocked state;

determining that every stack in the plurality of stacks is in the blocked state or a completed state;

dividing, in response to the determining, the plurality of expressions into one or more partitions, wherein each partition of the one or more partitions comprises one or more blocked expressions associated with at least one similar characteristic, wherein the dividing is based, at least in part, on the at least one similar characteristic;

for each particular partition of the one or more partitions, dispatching a single batch processing call to an application server to perform a batch evaluation of the one or more blocked expressions associated with the at least one similar characteristic, receiving results from the application server, and updating the one or more blocked expressions with the results; and unblocking the one or more stacks.

9. The one or more non-transitory computer-readable media of claim 8, further comprising instructions, which when executed by the one or more processors cause:

transitioning a state of each stack of the plurality of stacks in the blocked state to the unblocked state or the completed state.

10. The one or more non-transitory computer-readable media of claim 8, wherein identifying expressions for batch evaluation comprises determining whether the expressions have a particular characteristic that is included in a pre-determined list of characteristics that are associated with expressions that should be batch evaluated.

11. The one or more non-transitory computer-readable media of claim 10, wherein the pre-determined list of characteristics comprises a characteristic of an expression that is evaluated via a database call.

12. The one or more non-transitory computer-readable media of claim 10, wherein the pre-determined list of characteristics comprises a characteristic of an expression that specifies a plurality of inputs.

13. The one or more non-transitory computer-readable media of claim 8, wherein the stack comprises a plurality of frames and wherein each frame of the plurality of frames corresponds to a particular evaluation iteration of the program subroutine.

14. The one or more non-transitory computer-readable media of claim 8, wherein the one similar characteristic comprises an attribute and wherein the attribute is one of: type of an expression, number of inputs specified in the expression, or a type of operation to be performed by the expression.

* * * * *

UNITED STATES PATENT AND TRADEMARK OFFICE
CERTIFICATE OF CORRECTION

| | | |
|---|---|---|
| PATENT NO. | : 12,135,988 B2 | Page 1 of 1 |
| APPLICATION NO. | : 17/496024 | |
| DATED | : November 5, 2024 | |
| INVENTOR(S) | : Eugene E. Marinelli et al. | |

It is certified that error appears in the above-identified patent and that said Letters Patent is hereby corrected as shown below:

In the Claims

In Claim 1, Column 8, Line 63, change "stacks to the blocked state;" to -- stacks to a blocked state --

In Claim 1, Column 8, Line 65, change "a state or a completed state;" to -- the blocked state or a completed state; --

In Claim 1, Column 8, Line 67, change "blocked expressions into one or more partitions," to -- expressions into one or more partitions, --

In Claim 8, Column 10, Line 7, change "stacks to the blocked state;" to -- stacks to a blocked state; --

Signed and Sealed this
Thirteenth Day of May, 2025

Coke Morgan Stewart
*Acting Director of the United States Patent and Trademark Office*